United States Patent [19]

Perry

[11] Patent Number: 5,139,466
[45] Date of Patent: Aug. 18, 1992

[54] CONTINUOUSLY VARIABLE TRANSMISSIONS

[76] Inventor: Forbes G. D B. Perry, Long Meadow, Church Street, Charlbury, Oxen. OX7 3PP, England

[21] Appl. No.: 555,446
[22] PCT Filed: Feb. 17, 1989
[86] PCT No.: PCT/GB89/00169
   § 371 Date: Aug. 14, 1990
   § 102(e) Date: Aug. 14, 1990
[87] PCT Pub. No.: WO89/09898
   PCT Pub. Date: Oct. 19, 1989

[30] Foreign Application Priority Data

Apr. 15, 1988 [GB] United Kingdom ............... 8808907

[51] Int. Cl.⁵ .................................... F16H 15/50
[52] U.S. Cl. .................................. 475/191; 475/216; 475/217; 74/721; 74/194
[58] Field of Search ............ 475/184, 185, 190, 191, 475/214, 215, 216, 217, 295, 296, 302; 74/721, 194

[56] References Cited

U.S. PATENT DOCUMENTS

| | | | |
|---|---|---|---|
| 2,060,884 | 11/1936 | Madle | 475/216/ |
| 3,406,597 | 10/1968 | de Brie Perry et al. | 475/216 X |
| 3,684,065 | 8/1972 | Scheiter | 192/3.52 |
| 3,822,610 | 7/1974 | Erban | 475/216 X |
| 4,355,547 | 10/1982 | Poole et al. | 475/217 |
| 4,638,687 | 1/1987 | de Brie Perry | 475/190 X |
| 4,756,211 | 7/1988 | Fellows | 475/214 X |
| 5,074,830 | 12/1991 | Perry | 475/216 |

FOREIGN PATENT DOCUMENTS

| | | |
|---|---|---|
| 1078791 | 8/1967 | United Kingdom . |
| 1128694 | 10/1968 | United Kingdom . |
| 2159591 | 12/1985 | United Kingdom . |
| 2150240 | 3/1987 | United Kingdom . |

*Primary Examiner*—Richard Lorence
*Assistant Examiner*—Benjamin Levi
*Attorney, Agent, or Firm*—Walter C. Farley

[57] ABSTRACT

A continuously variable transmission has a variable transmission unit which provides a variable speed ratio between an input member (2) and an output member (3). The output member drives an output transmission member (11) through a simple drive connection (19-23) in a first regime of the transmission, and by way of a power recirculation system (7-10) in a second regime. The transmission is arranged so that only a clutching operation is required to effect a synchronous changeover between regimes.

1 Claim, 2 Drawing Sheets

CONTINUOUSLY VARIABLE TRANSMISSIONS

This invention relates to continuously variable transmissions and particularly to a transmission which has two modes or regimes. In a first regime an output member of a variator, such as a toroidal race, rolling traction variator, drives an output shaft or other transmission member directly, such as through a simple gearing or chain connection. In a second regime the output member of the variator drives the output transmission by way of an epicyclic movement providing power recirculation. In both regimes the transmission ratio between the input and output members in the variator can be continuously varied between a minimum and a maximum. For a toroidal race rolling traction variator the variation in transmission ratio is effected by means for altering the rotary axes of rollers which engage toroidal races defined by the input and output members of the variator.

Normally the said second regime is employed for speed ratios between reverse and low forward speed and the said first regime is employed for higher speeds. Various examples of such transmissions are well known.

It is necessary to provide means for changing from one regime to the other. Several such means are known. The one described in U.S. Pat. No. 4,638,687 relies on the arrangement of the transmission to include a relative reversal as between the transmission paths from the output member of the variator to an output shaft. The known system includes a one way drive (such as a sprag clutch) to achieve change over, and in the specific example described in that application, an automatic change over between regimes. The arrangement is such however that the change-over between regimes must occur at some point within the range of variation of transmission ratio of the variator. Moreover, the drive system between the roller epicyclic and the output transmission member is complex and includes two parallel paths, one path typically comprising a sprag clutch and the other path comprising a locking member.

SUMMARY OF THE INVENTION

The main object of the present invention is to provide a transmission of generally similar type, in which the change over between regimes can be a shockless synchronous change, there being no change in overall transmission ratio during the change in regimes, and the transmission is considerably simplified, avoiding the use of parallel transmission paths between the power recirculation system and the output transmission member and the consequent necessity of a change in transmission path within the second regime.

To this end, the transmission is arranged such that when the second or "low" regime provides a maximum forward speed, the ratio of the variator is at its maximum reduction and this corresponds to the minimum forward speed provided in the first or "high" regime. A change over between regimes under these circumstances is a shockless synchronous change. Only simple declutching and clutching operations are required for the change over and, where clutches are provided in both the transmission path directly from the output member of the variator to the output transmission member (such as the output shaft) and in the transmission path between the power recirculation system and the said output transmission member, both clutches could be engaged during the change over between regimes.

DETAILED DESCRIPTION OF THE EMBODIMENTS

Figure 1:
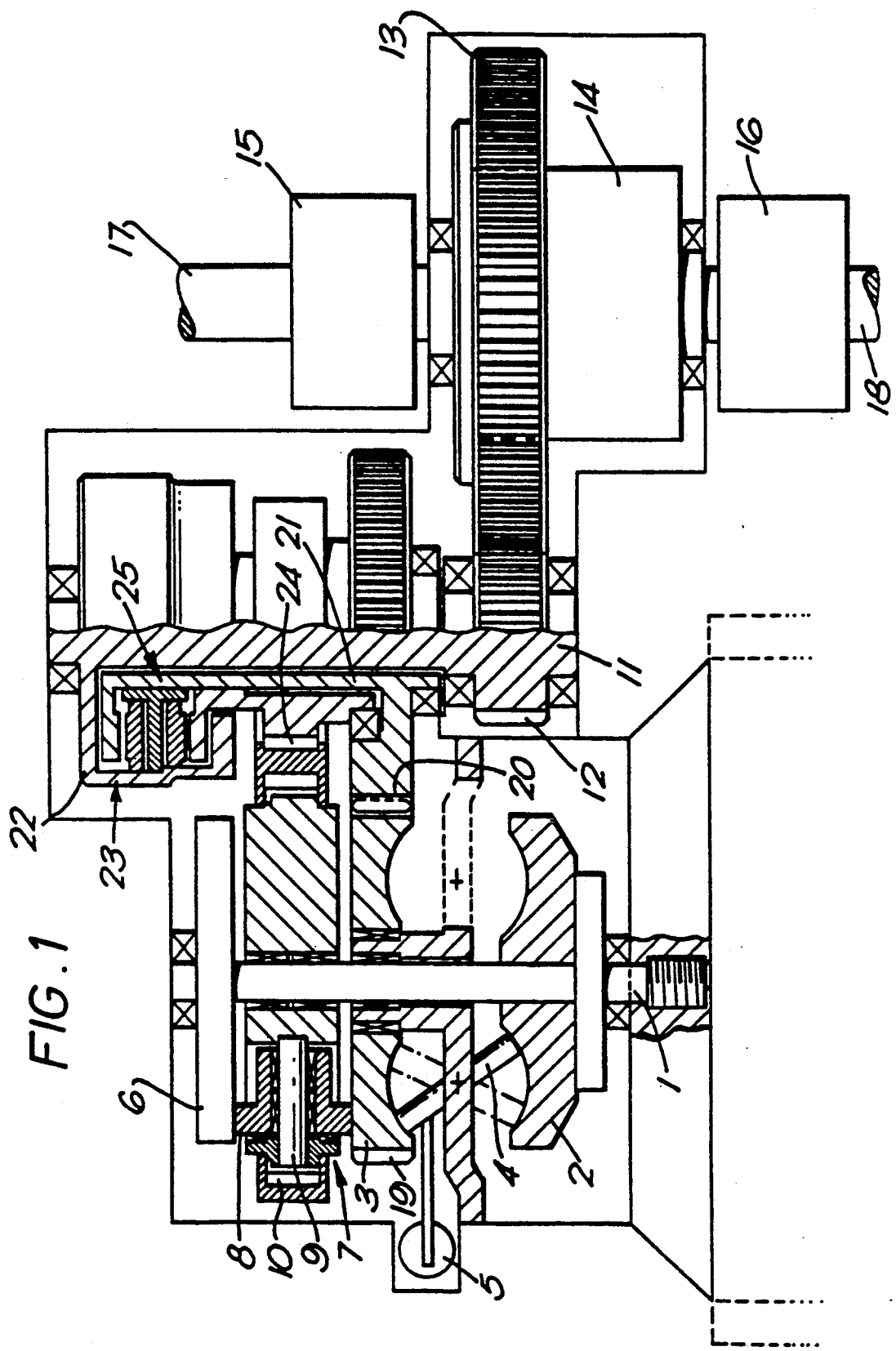
FIG. 1 illustrates one embodiment of the invention.

Referring firstly to FIG. 1, an input shaft 1 for the transmission unit has fixed to it a first, input member 2 of a variable transmission unit, herein called a variator, comprising a toroidal race confronting a second, output member 3 of the unit likewise comprising a toroidal race. Rollers 4 engage the two toroidal races and by means of a known adjusting system 5 can be changed in their axes of rotation to provide a continuously variable transmission ratio between the input and output members of the unit. Typically the range of transmission ratio can vary between a maximum of 1.6 and a minimum of 0.4, though these figures are by way of example only.

Also fixed relative to the input shaft 1 is a disc 6 confronting the rear face of the output member 3. Between the disc 6 and the output member 3 is an epicyclic carrier 7 supporting rollers 8 (of which only one is shown) engaging the confronting axially directed faces of the output member 3 and the disc 6. The roller 8 is mounted on a radially directed spindle 9 in the carrier, the onward connection from which will be described later. The rollers 8 provide end thrust for the output member 3 of the variator.

An output transmission member for the transmission is constituted in this embodiment by an output shaft 11 carrying a final drive pinion 12 engaging an input pinion 13 of, for example, a differential 14 which is connected, for example in a manner well known in itself, to constant velocity joints 15 and 16 driving half shafts 17 and 18 respectively. It should be understood however that these final drive arrangements are stated only by way of an example in which the embodiment is used as part of a front wheel drive for a vehicle.

The output member 3 of the variator has a geared annulus 19 engaging a geared annulus 20 on a sleeve member 21 which can drive by way of a clutch 23 a sleeve 22 integral with or fixed to the final output drive shaft 11 of the transmission. The connection between the output member 3 and the output transmission member 11 is thereby a simple, geared connection, although a simple direct chain connection or a gear chain including idlers may be used instead.

The transmission path between the roller epicyclic and the output drive shaft 11 is by way of a chain connection between the geared annulus 10 and a geared sleeve 24 which can be connected to the sleeve 22, and thereby to the shaft 11, by the clutch 25. Once again this is a simple transmission system not requiring any parallel paths and may be constituted by a gear chain, possibly including idlers, instead.

Two-regime systems normally have a "low" regime in which the transmission ratio between input and final output is variable between reverse to low forward speed through a neutral phase known as "geared idle". In this regime power recirculation takes place through one or more epicyclic systems, as in the embodiment shown in FIG. 1. In a "high" regime, the overall transmission ratio extends from a low forward speed to a full speed, which is usually an overdrive speed; in this regime the output from the variable transmission unit or variator is coupled simply, that is to say not through any epicyclic system, to the output transmission member, namely the final output shaft.

The embodiment shown in FIG. 1 is of this kind as far as the two regimes are concerned. It employs a roller recirculation system, which is known per se, instead of the more usual epicyclic geared connection in the "low" regime. More particular to the present invention however, the ratios are so chosen that when the "low" power recirculation regime provides a maximum forward speed, the ratio of the variable unit is at its maximum reduction. Typically, where the transmission ratio within the variable transmission unit can vary between 1.6 and 0.4, the corresponding range of variation in the overall transmission ratio between input and final output shaft extends from −0.25 (when the ratio within the variable transmission unit is 1.6) to +0.25 (when the variable ratio within the variable transmission unit corresponds to 0.4). Again, these figures are given by way of example only. The point at which the maximum reduction within the variable transmission unit occurs corresponds to the maximum reduction in the unit for the "high" regime. Thus the change over between regimes can be a shockless synchronous change. The change over between regimes is effected by means of operation of the clutches 23 and 25. Both clutches could be engaged during the change over phase.

In the embodiment of FIG. 1, only a synchronous clutch-swapping operation is involved in shifting regimes and accordingly the embodiment provides a continuously variable transmission ratio between, typically, 0.25 reverse, through geared idle to, typically, 1.6:1 overdrive.

In the embodiment of FIG. 1 the roller epicyclic ratio is 1:1. This is not necessary, as is illustrated by FIG. 2.

Figure 2:
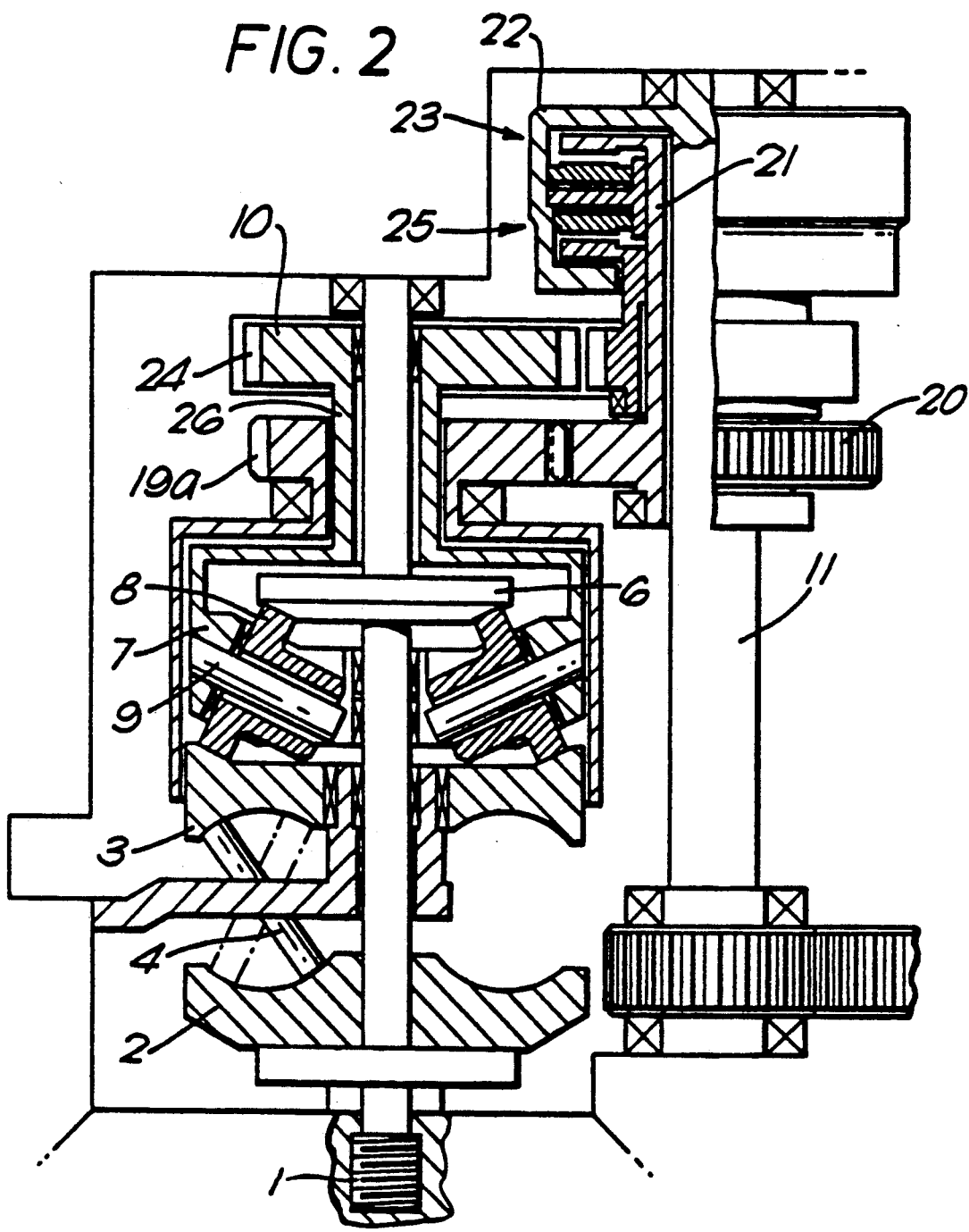
FIG. 2 illustrates a second embodiment of the invention.

In the embodiment shown in FIG. 2, the rollers of the roller epicyclic are tilted relative to the output member 3 of the variable transmission unit and the disc 6. The roller carrier 7 is connected by way of a sleeve to the gear 10 which drives the gear 24 through a chain connection as described with reference to FIG. 1. The output member 3 is connected by way of a sleeve to a gear 19a which engages a gear 20 on the output shaft 11.

In this embodiment, the speed ratio of the roller epicyclic is not 1:1 but can be skewed in favour of forward or reverse so as to provide a higher maximum overall transmission ratio in reverse at the expense of a lower maximum overall transmission ratio in forward movement or vice versa according to preference.

A further difference between the embodiments is that in FIG. 1 the drive connection from the output member 3 to the final drive shaft is disposed internally, that is to say inboard of the roller epicyclic system. However for transmission systems intended for higher power outputs it may be preferable to adopt the configuration shown in FIG. 2, wherein the drives from the output member 3 of the variable transmission unit are both direct and by way of the roller epicyclic are brought out to the rear of the transmission system.

In both embodiments, the operations of declutching and clutching required for changing the regimes can always be made synchronous. Even if the range of output speed ratio of the roller recirculator section is not itself numerically convenient for a synchronous change, the reduction or step up ratios possible in the drive connections to the final drive member makes speed matching always feasible to achieve a synchronous change.

I claim:
1. A continuously variable transmission comprising
an input rotary shaft and a rotary output transmission member;
a toroidal race rolling traction variable transmission unit including
a first toroidal race member rotatable with said input shaft,
a second toroidal race member rotatable relative to said input shaft, and
rollers engaging said first and second toroidal races and adjustable to provide a continuously variable transmission ratio between said first and second toroidal race members;
a roller epicyclic comprising
a first confronting face defined by said second race member and a second confronting face defined by a member rotatable with said input shaft,
a planet carrier, and
a plurality of rollers carried by said planet carrier and engaging both of said confronting faces, whereby said planet carrier is driven in accordance with a speed difference between said input shaft and said second race member;
means defining a first non-epicyclic bidirectional drive connection between said second race member and said output transmission member for bidirectionally driving said output transmission member, said first drive connection including first clutching means; and
means defining a second non-epicyclic bidirectional drive connection between said planet carrier and said output transmission member for bidirectionally driving said output transmission member said second drive connection consisting of a single transmission path and including a second single bi-directional clutching means; said transmission being operable in a first regime wherein said second clutching means is engaged and said first clutching means is released, said first regime extending from a minimum speed reduction in said variable transmission unit, corresponding to a reverse ration between said input shaft and said output transmission member, through a geared idle condition to a minimum speed reduction in the variable transmission unit, corresponding to a low forward speed ratio between said input shaft and said output transmission member and a second regime wherein said first clutching means is engaged and said second clutching means is disengaged, said second regime extending from a maximum speed reduction in the variable transmission unit to a minimum speed reduction in said transmission unit and corresponding to a range of variation from said low forward speed to a higher forward speed in the ratio between the input shaft and the output transmission member.

* * * * *